United States Patent
Shin

(10) Patent No.: US 10,048,524 B2
(45) Date of Patent: Aug. 14, 2018

(54) TOP CASE HAVING OUTSERT MOLDING MEMBER AND DISPLAY DEVICE HAVING THE SAME

(71) Applicant: LG DISPLAY CO., LTD., Seoul (KR)

(72) Inventor: Sungjin Shin, Daegu (KR)

(73) Assignee: LG DISPLAY CO., LTD., Seoul (KR)

( * ) Notice: Subject to any disclaimer, the term of this patent is extended or adjusted under 35 U.S.C. 154(b) by 0 days.

(21) Appl. No.: 15/363,855

(22) Filed: Nov. 29, 2016

(65) Prior Publication Data
US 2017/0153488 A1 Jun. 1, 2017

(30) Foreign Application Priority Data

Nov. 30, 2015 (KR) .......................... 10-2015-0169235

(51) Int. Cl.
*G02F 1/1333* (2006.01)
(52) U.S. Cl.
CPC .................. *G02F 1/133308* (2013.01); *G02F 2001/13332* (2013.01); *G02F 2201/46* (2013.01); *G02F 2201/503* (2013.01)
(58) Field of Classification Search
CPC ......... G02F 1/133308; G02F 2201/503; G02F 2001/13332; G02F 2201/46
See application file for complete search history.

(56) References Cited

U.S. PATENT DOCUMENTS

| | | | | |
|---|---|---|---|---|
| 5,648,757 A | * | 7/1997 | Vernace | G08B 21/24 206/305 |
| 9,179,558 B1 | * | 11/2015 | Limber | H05K 5/0004 |
| 2003/0043312 A1 | * | 3/2003 | Nishida | G02F 1/133308 349/58 |
| 2004/0109104 A1 | * | 6/2004 | Lee | G02F 1/133308 349/58 |
| 2005/0231658 A1 | * | 10/2005 | Chieh | G02F 1/133308 349/56 |
| 2008/0151579 A1 | * | 6/2008 | Kim | G02F 1/133608 362/633 |
| 2008/0246692 A1 | * | 10/2008 | Jeong | G06F 1/1618 345/1.3 |
| 2009/0153768 A1 | | 6/2009 | Ooami | |

(Continued)

FOREIGN PATENT DOCUMENTS

| | | |
|---|---|---|
| JP | 3738350 B2 | 1/2006 |
| JP | 2009-53440 A | 3/2009 |

(Continued)

*Primary Examiner* — Donald Raleigh
(74) *Attorney, Agent, or Firm* — Birch, Stewart, Kolasch & Birch, LLP

(57) ABSTRACT

A display device is discussed, which includes a top case disposed on a display panel, the top case may include a main body having a metal first upper member covering a partial area of an edge area of the display panel and an elastic second upper member extending from the metal first upper member and fixing the display panel. The metal first upper member and the elastic second upper member may be formed together by outsert molding. Since the top case includes an elastic upper member made of a material such as rubber or silicon, not metal, a scratch on the display panel or a polarizing plate which may be generated by a press of the display panel by an external force may be avoided.

20 Claims, 5 Drawing Sheets

(56) References Cited

U.S. PATENT DOCUMENTS

| | | | |
|---|---|---|---|
| 2009/0262554 A1* | 10/2009 | Lee | G02F 1/133308 |
| | | | 362/633 |
| 2009/0310288 A1* | 12/2009 | Lee | G02F 1/133308 |
| | | | 361/679.01 |
| 2013/0083272 A1* | 4/2013 | Tanabe | G02F 1/133308 |
| | | | 349/96 |
| 2013/0194781 A1* | 8/2013 | Kim | H04M 1/0266 |
| | | | 362/97.1 |
| 2014/0076753 A1* | 3/2014 | Limber | H04B 1/3888 |
| | | | 206/320 |
| 2016/0216729 A1* | 7/2016 | Ohtomo | G06F 1/1601 |
| 2016/0234951 A1* | 8/2016 | Chen | H05K 5/03 |

FOREIGN PATENT DOCUMENTS

| | | |
|---|---|---|
| JP | 4516106 B2 | 8/2010 |
| JP | 2015-135430 A | 7/2015 |
| KR | 10-2012-0057405 A | 6/2012 |

* cited by examiner

TOP CASE HAVING OUTSERT MOLDING MEMBER AND DISPLAY DEVICE HAVING THE SAME

CROSS-REFERENCE TO RELATED APPLICATION

Pursuant to 35 U.S.C. § 119(a), this application claims the benefit of earlier filing date and right of priority to Korean Application No. 10-2015-0169235, filed on Nov. 30, 2015, the contents of which is incorporated by reference herein in its entirety.

BACKGROUND OF THE INVENTION

1. Field of the Invention

The present invention relates to a top case and a display device having the same, and more particularly, to a top case having an outsert molding member and a display device.

2. Description of the Related Art

Recently, with the development of various portable electronic devices such as a mobile phone, a tablet PC, and a notebook computer, a request of a flat panel display device which is lightweight, thin, short and small and may be applied to the portable electronic devices, has been gradually increased. A liquid crystal display device, a plasma display panel, an organic electroluminescence display device, and an electrophoresis display device have been actively studied as examples of the flat panel display device.

After the display device is supplied to a set manufacturer such as a mobile phone manufacturer or a tablet PC manufacturer, the display device is coupled to a main body of an electronic device such as a mobile phone or a tablet PC by the set manufacturer. Problems may occur as follows during this coupling.

Generally, the display device includes devices such as a display panel and a backlight that are assembled together by a lower case and a top case. At this time, since the top case covers an edge area of an upper surface of the display device where a screen is displayed, the top case may be partially exposed together with the screen when the display device is coupled to the main body of the electronic device. Particularly, when the display device is coupled to the electronic device, since an external case of the electronic device covers the screen of the display device within a minimum range to minimize the edge area of the display device, the top case may be exposed externally together with the screen of the display device.

However, since the top case of the display device according to the conventional art is mainly made of metal, if the top case is partially exposed together with an external area of the screen, externally incident light is reflected by the exposed top case. For this reason, deterioration of picture quality, such as a bright line or glittering generated at the edge area of the screen by the reflective light when an image is displayed, may be caused.

SUMMARY OF THE INVENTION

Therefore, an object of the present invention is to solve the aforementioned problems. Another object of the present invention is to provide a top case of a display device, which covers an edge area of a liquid crystal panel to fix the liquid crystal panel and is made of an elastic member.

Other object of the present invention is to provide a display device provided with the above top case.

To achieve these and other objects and in accordance with the purpose of the present invention, as embodied and broadly described herein, according to the present invention, a top case disposed on an upper surface of a display panel, covering an edge area of the display panel includes an elastic member having a material such as rubber or silicon, not metal, whereby a scratch, which may be generated on the display panel or a polarizing plate during a contact with the top case, or light leakage, which may be generated by a press of the display panel by an external force, can be avoided.

An elastic fixing member may be formed together with a metal upper member of the top case by outsert molding, and a predetermined colored pigment or dye may be included in the fixing member, whereby the top case exposed to the outside is implemented in a desired color by a set manufacturer and thus external appearance of an electronic device may be decorated esthetically like a frame effect when the top case is packaged in the electronic device.

A protrusion and a recess may respectively be disposed on a coupling surface of the upper member of the top case and a coupling surface of the fixing member to increase a coupling area when the upper member of the top case is coupled to the fixing member, whereby a coupling force between the upper member of the top case and the fixing member is increased.

The present invention may be applied to various types of flat panel display devices such as a liquid crystal display device, an organic electroluminescence display device, and an electrophoresis display device.

In the present invention, as the top case is partially formed of an elastic member, the following advantages can be obtained.

First of all, in the present invention, since the fixing member extended from the upper member of the top case for assembling the display panel to cover the edge area of the liquid crystal panel is formed of an elastic member, even in the case that the fixing member is partially exposed through a screen display area of the electronic device when the display device is coupled to a main body of the electronic device, poor picture quality, such as a bright line or glittering generated at the edge area of the screen by reflective light, is not generated. Moreover, the fixing member may be formed of a black material that can absorb light, whereby poor picture quality can be avoided effectively.

Secondly, in the present invention, since the fixing member is made of resin having elasticity such as rubber or silicon softer than metal, a scratch can be prevented from being generated on a surface of the liquid crystal panel or a polarizing plate even in the case that the fixing member is in contact with the upper surface of the liquid crystal panel or a surface of the polarizing plate.

Thirdly, since rubber or silicon constituting the fixing member of the present invention has elasticity, the elastic body absorbs impact even in the case that external impact is applied to the elastic body. As a result, light leakage generated by distorted alignment of liquid crystal molecules, which is caused by a press of the liquid crystal panel by the impact, can be avoided.

Further scope of applicability of the present application will become more apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from the detailed description.

BRIEF DESCRIPTION OF THE DRAWINGS

The accompanying drawings, which are included to provide a further understanding of the invention and are incorporated in and constitute a part of this specification, illustrate exemplary embodiments and together with the description serve to explain the principles of the invention.

In the drawings.

DETAILED DESCRIPTION OF THE EMBODIMENTS

Hereinafter, the present invention will be described in detail with reference to the accompanying drawings.

Figure 1:
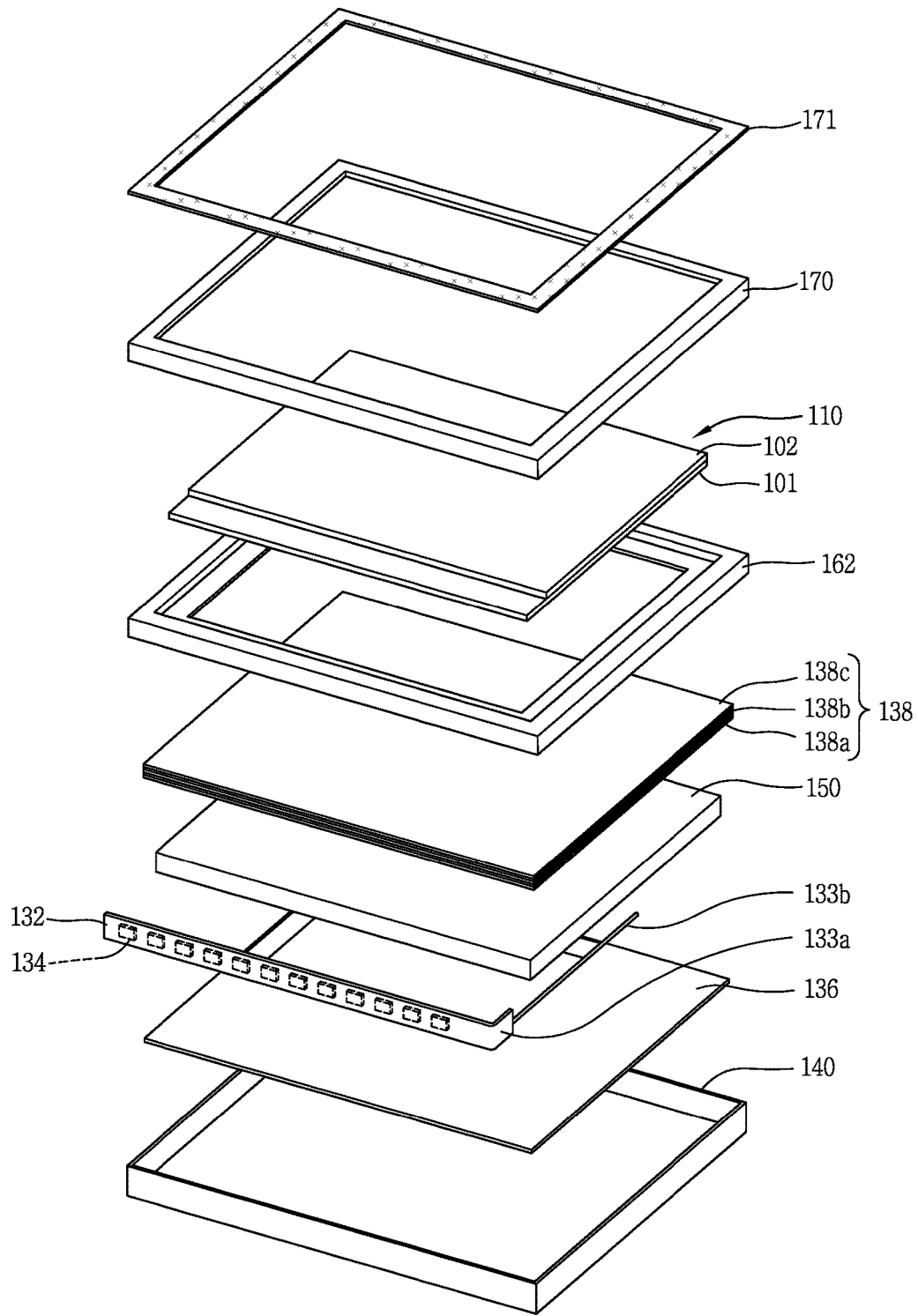
FIG. 1 is an exploded perspective view illustrating a structure of a display device according to an embodiment of the present invention.
Figure 2:
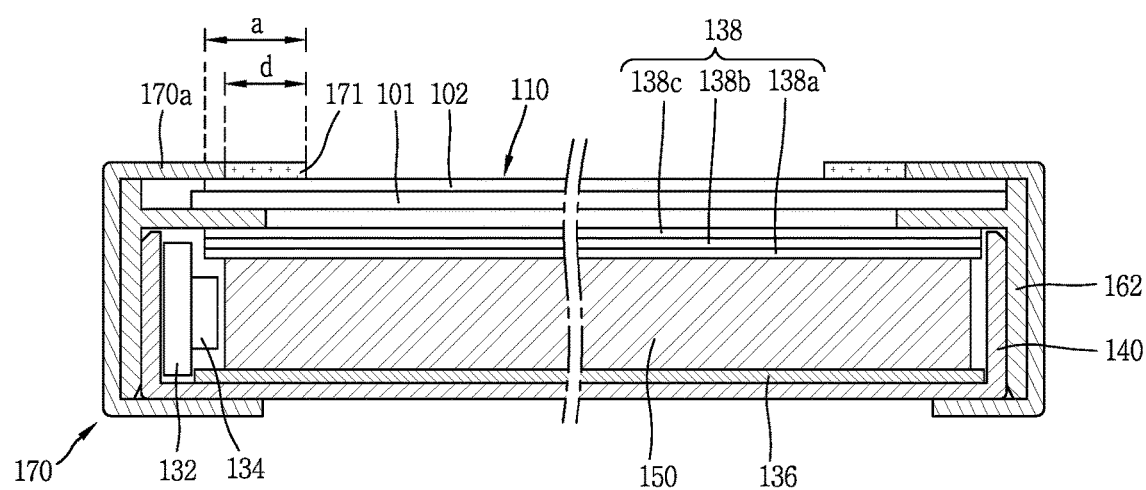
FIG. 2 is a cross-sectional view illustrating a structure of a display device according to an embodiment of the present invention.

FIGS. 1 and 2 are views illustrating a structure of a display device according to the present invention, wherein FIG. 1 is an exploded view and FIG. 2 is a cross-sectional view illustrating a coupling structure. Although a liquid crystal display device is exemplarily described with reference to the drawings, the present invention is not applied to the liquid crystal display device only and may be applied to various display devices such as an organic electroluminescence display device, a plasma display device, and an electrophoresis display device.

As shown in FIGS. 1 and 2, the liquid crystal display device according to the present invention includes a liquid crystal panel 110 and a backlight. The liquid crystal panel 110 includes a first substrate 101, a second substrate 102, and a liquid crystal layer between the first substrate 101 and the second substrate 102, and displays an image as an external signal is applied thereto.

The backlight includes a light emitting device (LED) substrate 132 disposed at a lower side of the liquid crystal panel 110, in which a plurality of LEDs 134 emitting light are packaged, a light guide plate 150 disposed below the liquid crystal panel 110, guiding the light emitted from the LEDs 134 and supplying the light to the liquid crystal panel 110, an optical sheet 138 including a diffusion sheet 138a and prism sheets 138b and 138c provided between the liquid crystal panel 110 and the light guide plate 150, diffusing and condensing the light guided by the light guide plate 150 and suppled to the liquid crystal panel 110, and a reflective plate 136 disposed below the light guide plate 150, reflecting the light guided to the lower portion of the light guide plate 150.

The reflective plate 136, the light guide plate 150 and the optical sheet 138 of the backlight are received in a lower case 140 and then assembled as the lower case 140 is coupled to a guide panel 162.

The liquid crystal panel 110 is disposed on the guide panel 162. The guide panel 162 is formed in a rectangular shape and thus an edge area of the liquid crystal panel 110 is disposed on the guide panel 162. Also, a top case 170 is provided at the edge area and side on the liquid crystal panel 110, and is coupled to the guide panel 162 and the lower case 140, whereby the liquid crystal panel 110 is assembled.

The liquid crystal panel 110 includes a first substrate 101, a second substrate 102, and a liquid crystal layer between the first substrate 101 and the second substrate 102. A plurality of gate lines and a plurality of data lines arranged to cross each other and define a plurality of pixel areas are formed on the first substrate 101, wherein each pixel area includes a thin film transistor which is a switching device and a pixel electrode formed on the pixel area. Also, the thin film transistor includes a gate electrode connected to the gate lines, a semiconductor layer formed by depositing amorphous silicon on the gate electrode, and source and drain electrodes formed on the semiconductor layer and connected to the data lines and the pixel electrode.

The second substrate 102 includes a color filter including a plurality of sub-color filters for displaying colors of red (R), green (G) and blue (B), and a black matrix for partitioning the sub-color filters and shielding the light transmitting the liquid crystal layer.

The first substrate 101 and the second substrate 102 as above are bonded to each other to face each other by a sealant formed outside the area where an image is displayed, thereby forming the liquid crystal panel. Bonding of the first substrate 101 and the second substrate 102 is performed through a bonding key formed on the first substrate 101 or the second substrate 102.

Also, a first polarizing plate and a second polarizing plate are attached to the first substrate 101 and the second substrate 102 to polarize the light input to and output from the liquid crystal panel 110, whereby transmittance of light transmitting the liquid crystal layer can be controlled to display an image.

If another display panel, for example, an organic electroluminescence display panel, a plasma display panel, or an electrophoresis display panel is used instead of the liquid crystal panel 110, an organic light emitting layer, a plasma layer, or an electrophoresis layer may be disposed between the first substrate and the second substrate instead of the liquid crystal layer which is an image display means for displaying an image.

The light guide plate 150 is to guide the light input from the LEDs 134 to the liquid crystal panel 110. In this case, after the light entering one side of the light guide plate 150, that is, light incident surface, is reflected on upper and lower surfaces of the light guide plate 150 and propagated to the other side of the light guide plate 150, the light is output to the outside through the upper surface of the light guide plate 150. At this time, the light guide plate 150 is a rectangular parallelepiped shape. The light guide plate 150 is formed of a material such as PMMA (Polymethyl-Methacrylate), glass or polyethyleneterephthalate (PET), and includes a lower surface provided with an engraved pattern or an engraving pattern to upwardly reflect the light entering the lower surface.

The light entering the light guide plate 150 through the light incident surface of the light guide plate 150 is reflected on the upper surface and the lower surface of the light guide plate 150 and then propagated to the side facing the light incident surface. At this time, the light entering the upper surface of the light guide plate 150 at a threshold angle or more with respect to a normal line of the upper surface of the light guide plate 150 is propagated by being totally reflected from the upper surface of the light guide plate 150 to the inside of the light guide plate 150, and the light entering the upper surface of the light guide plate 150 at the threshold angle or less is emitted through the upper surface of the light guide plate 150 and supplied to the liquid crystal panel 110.

The optical sheet 138 improves efficiency of the light output from the light guide plate 150 to supply the light to the liquid crystal panel 110. The optical sheet 138 includes a diffusion sheet 138a diffusing the light output from the light guide plate 150, and a first prism sheet 138b and a second prism sheet 138c, which condense the light diffused by the diffusion sheet to uniformly supply the light to the liquid crystal panel 110. At this time, although one diffusion sheet 138a is provided, the two prism sheets, the first prism sheet 138b and the second prism sheet 138c, where prisms vertically cross each other in x,y-axis direction, are provided to refract the light in the x,y-axis direction and thus improve linearity of the light.

R, G, B LEDs emitting single colored light of red (R), green (G) and blue (B), or LED devices emitting white light may be used as the LEDs 134.

If the LEDs emitting single colored light are arranged, the single colored LEDs of R, G and B are alternately arranged at certain intervals, whereby the single colored light emitted from the LEDs is mixed with the white light and then supplied to the liquid crystal panel 110. If the LED devices emitting white light are provided, the plurality of LED devices are arranged at certain intervals to supply the white light to the liquid crystal panel 110.

At this time, the white light LED devices include a blue LED emitting blue light and a fluorescent body absorbing the single colored light to emit yellow light, whereby the blue single colored light output from the blue LED and the yellow singe colored light emitted from the fluorescent body are mixed with each other and supplied to the liquid crystal panel 110 as the white light. Although the LEDs 134 are arranged at one side of the light guide plate 150 as shown, the LEDs 134 may be arranged at both sides of the light guide plate 150.

The LEDs 134 are packaged in the LED substrate 132 made of metal or a flexible film. The LED substrate 132 is arranged along the side of the light guide plate 150 to face the side of the light guide plate 150, and the LEDs 134 are packaged in the LED substrate 132 to allow the light of the LEDs 134 to enter the light guide plate 150 through the side of the light guide plate 150.

A flexible circuit board 133a is attached and connected to an end of the LED substrate 132, and a wire 133b is attached to an end of the flexible circuit board 133a. The flexible circuit board 133a and the wire 133b connect the LEDs 134 packaged in the LED substrate 132 with a driving circuit portion outside the liquid crystal display device, whereby an external signal and power are supplied to an LED controller, and the LED controller drives the LEDs 134 in accordance with this input signal. A signal line is formed on the upper surface and/or the lower surface of the flexible circuit board 133a, and is electrically connected with the wire 133b, whereby the signal of the driving circuit portion is input to the LED substrate 132 through the wire 133b and the signal line of the flexible circuit board 133a.

Meanwhile, a light source supplying light to the liquid crystal panel 110 is not limited to the LEDs 134 in the present invention. In the present invention, the LEDs 134 are exemplarily be described as the light source for convenience of description, and it is to be understood that the light source of the present invention is not limited to the LEDs 134.

A fluorescent lamp such as a cold cathode fluorescent lamp (CCFL) or an external electrode fluorescent lamp (EFFL) may be used as the light source. If the fluorescent lamp is used, the LED substrate 132 is not required, and a lamp housing for receiving the fluorescent lamp may be arranged at one side of the light guide plate. A reflective material is deposited on an inner surface of the lamp housing to reflect the light emitted from the fluorescent lamp toward the side of the light guide plate 150, whereby light efficiency is improved.

The guide panel 162 is coupled to the lower case 140 to surround the edge of the optical sheet 138 of the liquid crystal panel 110 and the side of the lower case 140. The liquid crystal panel 110 is mounted on the guide panel 162.

The reflective plate 136 is disposed below the light guide plate 150 and above the lower case 140. The reflective plate 136 reflects the light emitted from the lower surface of the light guide plate 150 and again reflects the light toward the inside of the light guide plate 150 to improve light efficiency.

The top case 170 is mechanically coupled to the lower case 140 and the guide panel 162, whereby the liquid crystal panel 110 and the backlight are assembled. At this time, an upper member of the top case 170 is disposed on a partial area of the edge of the liquid crystal panel 110, and a side of the top case 170 is coupled to the lower case 140 and the guide panel 162.

As shown, a fixing member 171 for fixing the liquid crystal panel 110 is disposed at the inner side of the upper member 170a of the top case 170. The fixing member 171 is made of resin of soft and good elasticity such as rubber or silicon, and is coupled to the upper member 170a to be extended from the upper member 170a of the top case 170 and disposed on the liquid crystal panel 110.

In the display device of the conventional art, the fixing member 171 extended from the upper member 170a of the top case 170 is not provided, and the top case made of metal is disposed on the liquid crystal panel 110. On the other hand, in the present invention, instead of the upper member 170a of the top case 170, the fixing member 171 is disposed on the liquid crystal panel 110 for the following reasons.

Another device such as a display panel and a backlight is assembled in the display device by the lower case and the top case. Since the top case covers the edge area of the upper surface of the display device, where a screen is displayed, when the top case is coupled to a main body of an electronic device, the top case may partially be exposed on the screen display area of the electronic device. However, since the top case of the display device according to the conventional art is mainly made of metal, if the top case is partially exposed to the outside of the screen display area, externally incident light is reflected by the exposed top case. For this reason, poor picture quality, such as a bright line or glittering generated at the edge area of the screen by the reflective light when an image is displayed, is caused.

However, in the present invention, since the fixing member 171 extended from the upper member 170a of the top case 170 to cover the edge area of the liquid crystal panel 110 is formed of resin such as rubber or silicon, even in the case that the fixing member 171 is partially exposed through the screen display area of the electronic device when the display device is coupled to the main body of the electronic device, reflectivity of externally incident light of the resin is lower than reflectivity of metal. Therefore, poor picture quality, such as a bright line or glittering generated at the edge area of the screen by the reflective light, is not generated. Moreover, the fixing member 171 is formed of a black material that can absorb light, whereby poor picture quality can be avoided effectively.

Figure 3A:
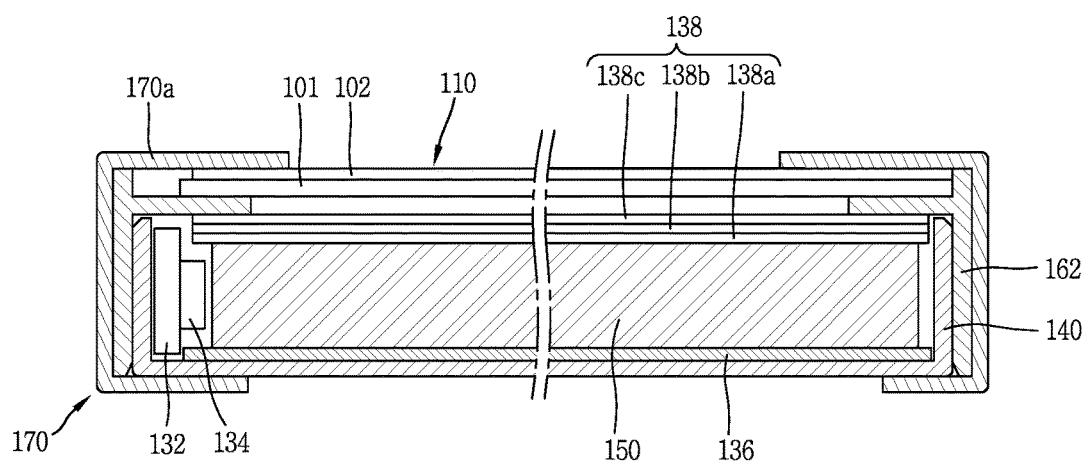
FIGS. 3A and 3B are cross-sectional views illustrating a structure of a liquid crystal display device having no fixing member.

Also, as shown in FIG. 3A, if the upper member 170a of the top case 170 is extended to the upper portion of the liquid crystal panel 110 without a separate fixing member 170 made of an elastic member like the present invention, the upper member 170a of the top case 170 is directly in contact with the upper surface of the liquid crystal panel 110, exactly the surface of the polarizing plate disposed on the liquid crystal panel 110. Generally, since the top case 170 is made of metal, if the polarizing plate is in contact with the upper member 170a of the top case 170, a scratch is generated on the polarizing plate. This scratch causes light leakage when an image of the liquid crystal display device is displayed.

Moreover, since the top case 170 is formed of metal in a molding process, a burr may be generated at an end of the upper member of the top case 170 during a press process. Since this burr is in contact with the surface of the polarizing plate and thus generates a scratch, light leakage of the liquid crystal display device is generated more seriously.

Meanwhile, if the liquid crystal panel 110 is a horizontal electric field mode liquid crystal display device, a horizontal electric field parallel with the surface of the liquid crystal panel 110 is applied to the liquid crystal layer of the liquid crystal panel 110, whereby liquid crystal molecules are switched along a surface horizontal to the surface of the substrate to control the amount of light transmitting the liquid crystal layer. If a pressure is applied to the upper surface of the liquid crystal panel 110 by the upper member 170a of the top case 170 as impact is applied to the top case 170, the electric field applied in parallel with the surface of the substrate is distorted by the pressure. That is, an electric field not parallel with the surface of the substrate is generated. Since this distortion of the electric field distorts alignment of the liquid crystal molecules of the liquid crystal layer, which are disposed along the electric field, light leakage is generated near the upper member 170a of the top case 170, that is, at the edge area of the screen.

Figure 3B:
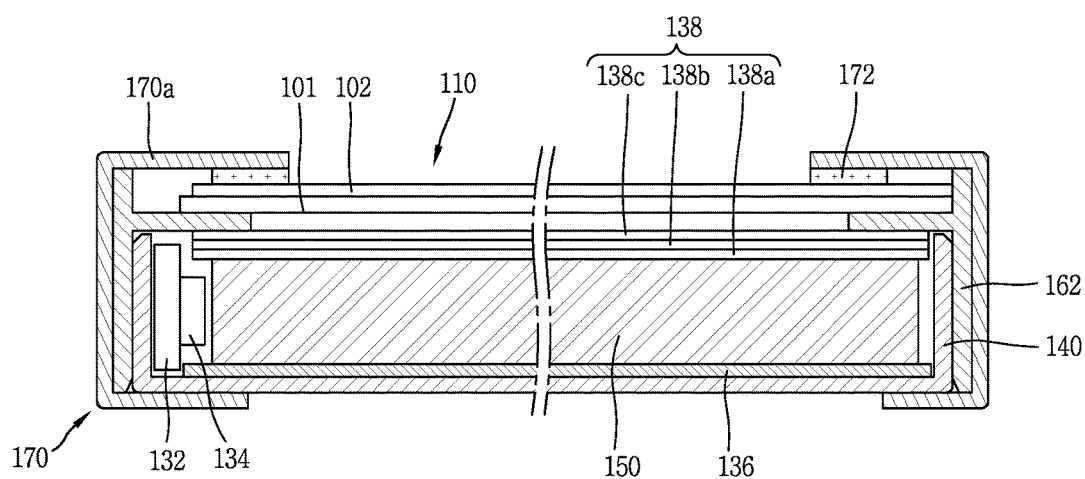

To solve this problem, as shown in FIG. 3B, a buffering member 172 such as a pad or tape is provided between the upper member 170a of the top case 170 and the liquid crystal panel 110 to prevent the upper member 170a of the top case 170 made of metal from being directly in contact with the liquid crystal panel 110, whereby a scratch can be prevented from being generated on the surface of the liquid crystal panel 110 or the polarizing plate by contact or friction with the upper member 170a of the top case 170. Also, in this structure, if impact is externally applied to the liquid crystal panel 110, the buffering member 172 absorbs the impact to allow the upper member 170a of the top case 170 to press the upper surface of the liquid crystal panel 110, whereby alignment of the liquid crystal molecules can be prevented from being distorted and thus light leakage can be avoided.

However, if the buffering member 172 is provided as above, since an expensive pad or tape is required, problems occur in that the manufacturing cost is increased and the manufacturing process is complicated due to addition of an adhesion process of the buffering member 172. Moreover, since adhesion of the pad or tape should directly be performed manually by a worker, a problem occurs in that the manufacturing process is delayed.

In the present invention, the fixing member 171 is disposed at one side on the top case 170, whereby the liquid crystal panel 110 can be fixed without a separate buffering member. Since the fixing member 171 is made of resin such as rubber or silicon softer than metal, even in the case that the fixing member 171 is in contact with the upper surface of the liquid crystal panel 110 or the surface of the polarizing plate, the scratch can be prevented from being generated on the surface of the liquid crystal panel 110 or the polarizing plate.

Also, since resin such as rubber or silicon has elasticity, even in the case that impact is externally applied, the elastic body absorbs the impact. Therefore, light leakage can be avoided, which is generated as the edge area of the liquid crystal panel is pressed by the impact and thus alignment of the liquid crystal molecules is distorted.

The material of the fixing member 171 of the present invention is not limited to resin, and any material having rigidity, which may not generate a scratch when the fixing member 171 is in contact with the liquid crystal panel or the polarizing plate, and a buffering effect, which may absorb externally applied impact, may be applied to the material of the fixing member 171.

Figure 4A:
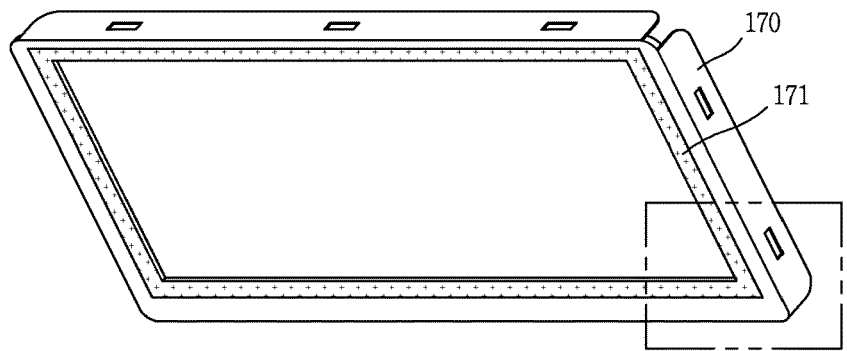
FIGS. 4A, 4B and 4C are views illustrating that a fixing member of a display device according to an embodiment of the present invention is fixedly attached to a top case.
Figure 4B:
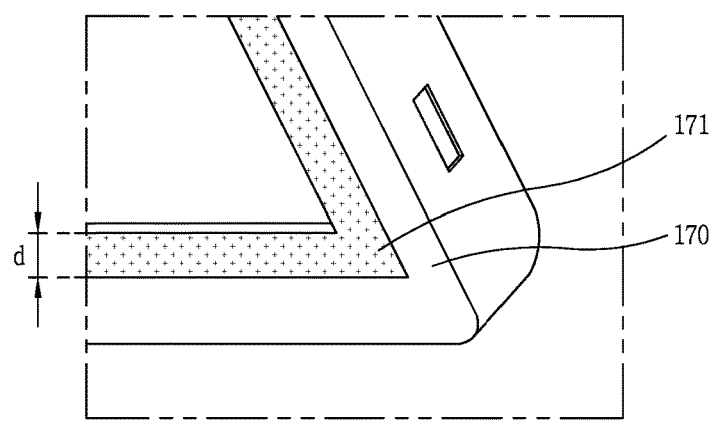
Figure 4C:
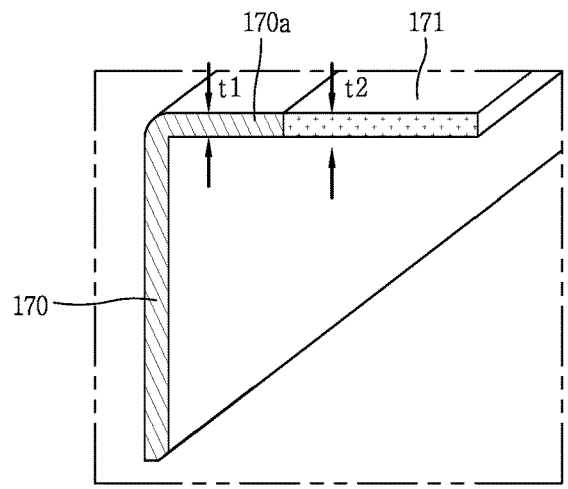

FIGS. 4A, 4B and 4C are views illustrating a coupling structure between the fixing member 171 and the upper member 170a of the top case 170.

As shown in FIG. 4A, the fixing member 171 is formed in a rectangular stripe shape. As shown in FIG. 4B, the fixing member 171 has a certain width and is coupled to the end on the top case 170, whereby the fixing member 171 is disposed at the inner side of the top case 170, that is, at the area where the liquid crystal panel 110 is disposed. As a result, the fixing member 171 is disposed on the liquid crystal panel 110 when the display device is assembled.

At this time, since the width 'd' of the fixing member 171 is formed to be smaller than a width of a shielding area of the liquid crystal panel 110 shown in FIG. 2, that is, an area 'a' covered by an external case although an image is displayed (d<a), when the liquid crystal display device is assembled, the fixing member 171 made of an elastic material is disposed on the edge area of the upper surface of the liquid crystal panel 110 and the upper member 170a of the top case 170 made of metal is not disposed on the upper surface of the liquid crystal panel 110. As a result, a scratch can be prevented from being generated on the upper surface of the liquid crystal panel 110 or the polarizing plate due to a contact between the upper member 170a of the top case 170 and the surface of the liquid crystal panel 110 or the polarizing plate. Also, since pressure is not applied to the liquid crystal panel 110 by the upper member 170a of the top case 170 even if impact is externally applied, light leakage caused by electric field distortion can be avoided.

Although the width 'd' of the fixing member 171 may have any size if the liquid crystal panel 110 is greater than the edge area covered by the external case, it is preferable that the width 'd' is small, if possible, to minimize a size of a bezel.

As shown in FIG. 4C, since a thickness t1 of the upper member 170a of the top case 170 and a thickness t2 of the fixing member 171 are set almost similar to each other, when the fixing member 171 is coupled to the end of the upper member 170a of the top case 170, the upper member 170a of the top case 170 and the fixing member 171 form the same plane, whereby the upper surface of the top case 170 to which the fixing member 171 is coupled may be regarded as one plate.

In the aforementioned description, although the fixing member 171 is referred to separately from the top case 170, an element that includes the fixing member 171 may be regarded as the top case 170 in view of the above aspect (that the upper member of the top case 170 to which the fixing member 171 is coupled may be considered as one plate). In this case, the top case 170 may be formed in a single body, whereas the top case 170 may be regarded to have two detachable structures in the present invention. That is, the upper member of the top case 170 may be regarded to be formed by the first member 170a formed in a single body with the top case 170 and the second surface 171 provided detachably from the first member 170a. At this time, the area disposed at the side of the display panel 110 and coupled to the guide panel and the lower case may be regarded as a main body in which the first member 170a and the second member 171 are installed.

The fixing member 171 is formed by an outsert molding process. That is, the elastic member such as resin is mold-ejected by an outsert mode, whereby the elastic member is fixedly attached to the end of the upper member 170a of the top case 170 formed by the press process and thus the fixing member 171 is coupled to the top case 170.

Figure 5:
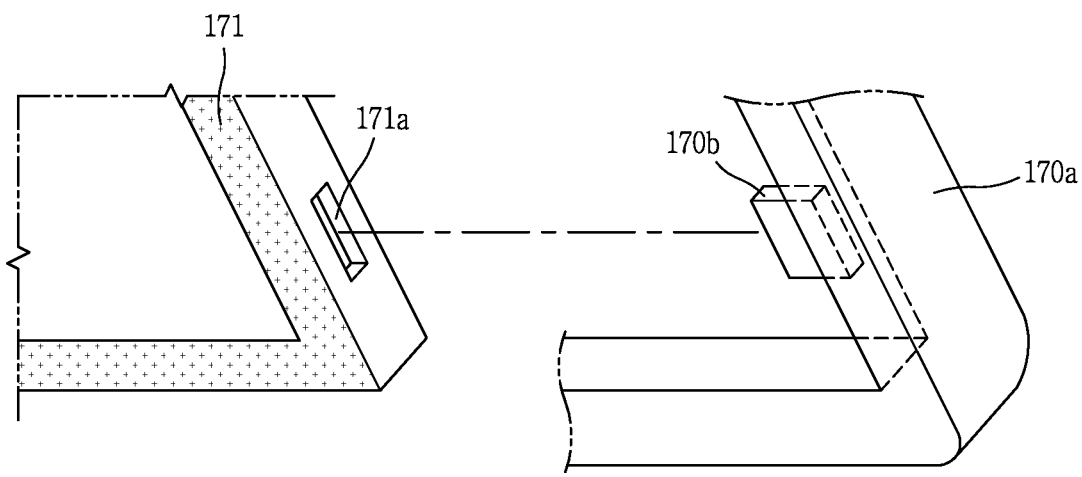
FIG. 5 is a view illustrating that a protrusion and a recess are respectively formed in a top case and a fixing member of a display device according to an embodiment of the present invention.

FIG. 5 is a partial enlarged view illustrating the upper member 170a of the top case 170 and the fixing member 171, which are coupled to each other by outsert molding. As shown in FIG. 5, a protrusion 170b and a recess 171a may respectively be formed on the coupling surface between the upper member 170a of the top case 170 and the fixing member 171. The protrusion 170b and the recess 171a are intended to rigidly fix and attach the fixing member 171 mold-ejected during outsert molding to the upper member 170a. That is, if at least one protrusion 170b having a predetermined width, thickness and length is formed on the upper member 170a of the metal top case 170 formed by the press, that is, the coupling surface, and is mold-ejected on the coupling surface by outsert molding, the recess 171a is formed in the fixing member 171 and a contact area of the coupling surface is increased, whereby the fixing member 171 is rigidly attached and fixed to the upper member 170a of the top case 170.

Although the protrusion 170b and the recess 171a are respectively formed on the coupling surface of the upper member 170a of the top case 170 and the coupling surface of the fixing member 171 in the drawing, the recess and the protrusion may respectively be formed on the coupling surface of the fixing member 171 and the coupling surface of the upper member 170a of the top case 170. In this case, after the recess having a certain depth, width and thickness is formed on the coupling surface of the upper member 170a of the top case 170 by the press, the recess is mold-ejected on the coupling surface by outsert molding, and the protrusion is formed in the fixing member 171, whereby the fixing member 171 is rigidly attached and fixed to the upper member 170a of the top case 170 by increase of the contact area of the coupling surface.

The fixing member 171 may be formed in various colors. If the display device is supplied to the set manufacturer and assembled with the electronic device, external appearance of the electronic device may be decorated esthetically by a frame effect that a screen outer edge of the electronic device is surrounded by a specific color. If the fixing member 171 is provided at a color desired by the set manufacturer, the set manufacturer may allow the screen outer edge of the electronic device to be surrounded by a specific color by means of a simple method by partially exposing the fixing member 171 as well as the screen where an image is displayed, when the display device is assembled with the electronic device.

In the same manner as the conventional art, if the top case 170 is formed of a press material of metal, since a separate painting process is required to form the upper member of the top case 170 covering the edge of the liquid crystal panel 110 in a specific color, the manufacturing cost is increased and the manufacturing process is delayed.

However, in the present invention, a dye or pigment of a desired color is contained in a molding material during outsert molding, whereby the fixing member 171 may be formed in various colors by a simple method. Particularly, if the fixing member 171 is formed in a black color, a defect such as a bright line or glittering generated at the screen outer edge area by reflection of light can be avoided even in the case that the fixing member 171 is partially exposed to the screen display area of the electronic device. Unlike the conventional art in which the fixing member is formed of metal, in the present invention, although a defect such as glittering generated at the screen edge area can be avoided even in the case that the fixing member 171 is not formed in a black color, if the fixing member 171 is formed in a black color, the defect such as a bright line or glittering at the screen edge area by reflection of light can be avoided more effectively.

As described above, in the present invention, the area disposed on the liquid crystal panel on the upper member of the top case is formed of a soft and elastic material, not metal, whereby a scratch can be prevented from being generated on the liquid crystal panel or the polarizing plate and external impact can be prevented from being transferred to the liquid crystal panel.

Although the specific structure of the embodiments of the present invention are described in the aforementioned description, the specific structure is intended for convenience of description, and the present invention is not limited to the specific structure. Since the present invention is characterized in that the area disposed on the liquid crystal panel on the upper member of the top case is formed of an elastic material, display devices of all structures having this characteristic may be included in the present invention. For example, although the guide panel, the lower case and the backlight are described in a specific structure in the aforementioned description, the present invention is not limited to the specific structure and may be applied to all structures which are currently known.

Also, although the liquid crystal display device is exemplarily described in the aforementioned description, the embodiments of present invention are not limited to a liquid crystal display device, and may be applied to flat panel display devices of various structures such as an organic electroluminescence display device and an electrophoresis display device. In this way, if the present invention is applied to another flat panel display device, the display panel fixed by the top case may include an organic electroluminescence display panel and an electrophoresis display panel.

The foregoing embodiments of the present invention and advantages are merely exemplary and are not to be considered as limiting the present disclosure. The present teachings can be readily applied to other types of apparatuses. This description is intended to be illustrative, and not to limit the scope of the claims. Many alternatives, modifications, and variations will be apparent to those skilled in the art. The features, structures, methods, and other characteristics of the exemplary embodiments described herein may be combined in various ways to obtain additional and/or alternative exemplary embodiments.

As the present features may be embodied in several forms without departing from the characteristics thereof, it should also be understood that the above-described embodiments are not limited by any of the details of the foregoing description, unless otherwise specified, but rather should be considered broadly within its scope as defined in the appended claims, and therefore all changes and modifications that fall within the metes and bounds of the claims, or equivalents of such metes and bounds are therefore intended to be embraced by the appended claims.

The present invention encompasses various modifications to each of the examples and embodiments discussed herein.

According to the invention, one or more features described above in one embodiment or example can be equally applied to another embodiment or example described above. The features of one or more embodiments or examples described above can be combined into each of the embodiments or examples described above. Any full or partial combination of one or more embodiment or examples of the invention is also part of the invention.

What is claimed is:

1. A display device comprising:
    a display panel having a screen for displaying an image;
    a top case for assembling the display panel, the top case having an upper member disposed at an edge area on the screen of the display panel;
    a lower case coupled with the top case to assemble the display; and
    an elastic fixing member coupled with a side sectional surface of the upper member of the top case and disposed at the edge area on the screen of the display panel to fix the display panel,
    wherein the elastic fixing member is made of a material having elasticity,
    wherein the upper member of the top case and the elastic fixing member extend along a same plane on the screen of the display panel,
    wherein one of the upper member of the top case and the elastic fixing member comprises a protrusion and the other of the upper member of the top case and the elastic fixing member comprises a recess, and
    wherein the protrusion is disposed in the recess to fix the upper member of the top case to the elastic fixing member.

2. The display device according to claim 1, wherein the display panel includes one of a liquid crystal panel, an organic electroluminescence display panel, and an electrophoresis display panel.

3. The display device according to claim 1, wherein the upper member of the top case is made of metal.

4. The display device according to claim 3, wherein the material of the elastic fixing member is a resin.

5. The display device according to claim 1, wherein the elastic fixing member includes a predetermined colored pigment or dye.

6. The display device according to claim 1, wherein the protrusion and the recess are respectively disposed on the upper member of the top case and a coupling surface of the elastic fixing member.

7. The display device according to claim 1, wherein the elastic fixing member is formed of a black material.

8. The display device according to claim 4, wherein the resin is rubber or silicon.

9. The display device according to claim 1, wherein the elastic fixing member is formed as a rectangular stripe shape at an inner side of the top case.

10. The display device according to claim 1, wherein a width of the elastic fixing member is smaller than a width of a shielding area of the display panel.

11. The display device according to claim 1, wherein the elastic fixing member is disposed on an edge area of an upper surface of the display panel to prevent contact between the display panel and the top case.

12. A top case for fixing a display panel, comprising:
    a metal main body;
    a metal first upper member extended from the main body and disposed at an outer edge on a screen of the display panel; and
    an elastic second upper member at the outer edge on the screen of the display panel to be coupled with a side sectional surface of the metal first upper member for fixing the display panel,
    wherein the elastic second upper member and the metal first upper member are formed by outsert molding,
    wherein the elastic second upper member and the metal first upper member extend along a same plane on the screen of the display panel,
    wherein one of the metal first upper member and the elastic second upper member comprises a protrusion and the other of the metal first upper member and the elastic second upper member comprises a recess, and
    wherein the protrusion is disposed in the recess to couple the metal first upper member to the elastic second upper member.

13. The top case according to claim 12, wherein the display panel includes one of a liquid crystal panel, an organic electroluminescence display panel, and an electrophoresis display panel.

14. The top case according to claim 12, wherein the elastic second upper member includes a resin.

15. The top case according to claim 14, wherein the resin is rubber or silicon.

16. The top case according to claim 12, wherein the protrusion and the recess are respectively disposed on the metal first upper member and the elastic second upper member.

17. The top case according to claim 12, wherein the protrusion and the recess are respectively disposed on the elastic second upper member and the metal first upper member.

18. The top case according to claim 12, wherein a width of the elastic second upper member is smaller than a width of a shielding area of the display panel.

19. The top case according to claim 12, wherein the elastic second upper member is formed as a rectangular stripe shape at an inner side of the top case.

20. The top case according to claim 19, wherein a width of the elastic second upper member is smaller than a width of a shielding area of the display panel.

* * * * *